June 13, 1961      J. H. POWELL      2,987,770

SEMI-AUTOMATIC RECAPPING PRESS

Filed May 1, 1959      4 Sheets-Sheet 1

INVENTOR.
JOHN H. POWELL
BY
McMorrow, Berman & Davidson
ATTORNEYS

June 13, 1961

J. H. POWELL 2,987,770

SEMI-AUTOMATIC RECAPPING PRESS

Filed May 1, 1959

INVENTOR.
JOHN H. POWELL
BY
McMorrow, Berman & Davidson
ATTORNEYS

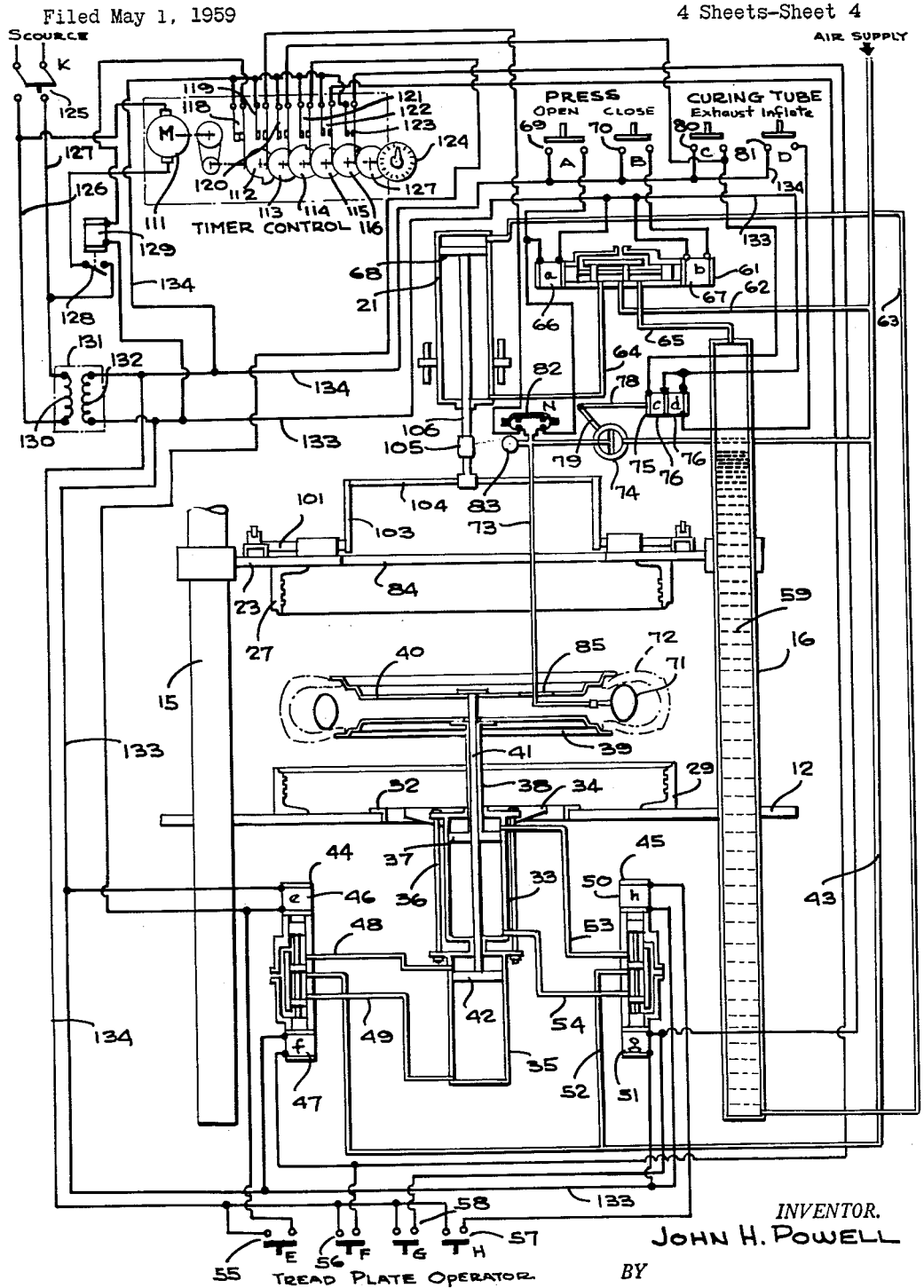

2,987,770
SEMI-AUTOMATIC RECAPPING PRESS
John H. Powell, 625 S. Washington St., Rocky Mount, N.C.
Filed May 1, 1959, Ser. No. 810,417
4 Claims. (Cl. 18—18)

This invention relates to tire repairing equipment, and more particularly to a tire recapping press.

The main object of the invention is to provide a novel and improved semi-automatic tire recapping press which is simple in construction, which is easy to operate, and which is designed to accommodate a wide range of sizes of passenger car and small truck tires.

A further object of the invention is to provide an improved tire recapping press which involves relatively inexpensive components, which is durable in construction, which is reliable in operation, and which is arranged so that it is not necessary to remove any bolts or use any tools to insert or remove the tire from the press, whereby a considerable saving in time and labor is achieved.

A still further object of the invention is to provide an improved tire recapping press which is easy to set up for use, which is positive in its operation, and which will operate for long periods of time without requiring any servicing.

Further objects and advantages of the invention will become apparent from the following description and claims, and from the accompanying drawings, wherein:

FIGURE 5 is a schematic diagram showing the electrical connections of the recapping press of FIGURES 1 to 4 and the fluid pressure and hydraulic piping associated with the press, together with the valve elements employed therewith.

Figure 1:
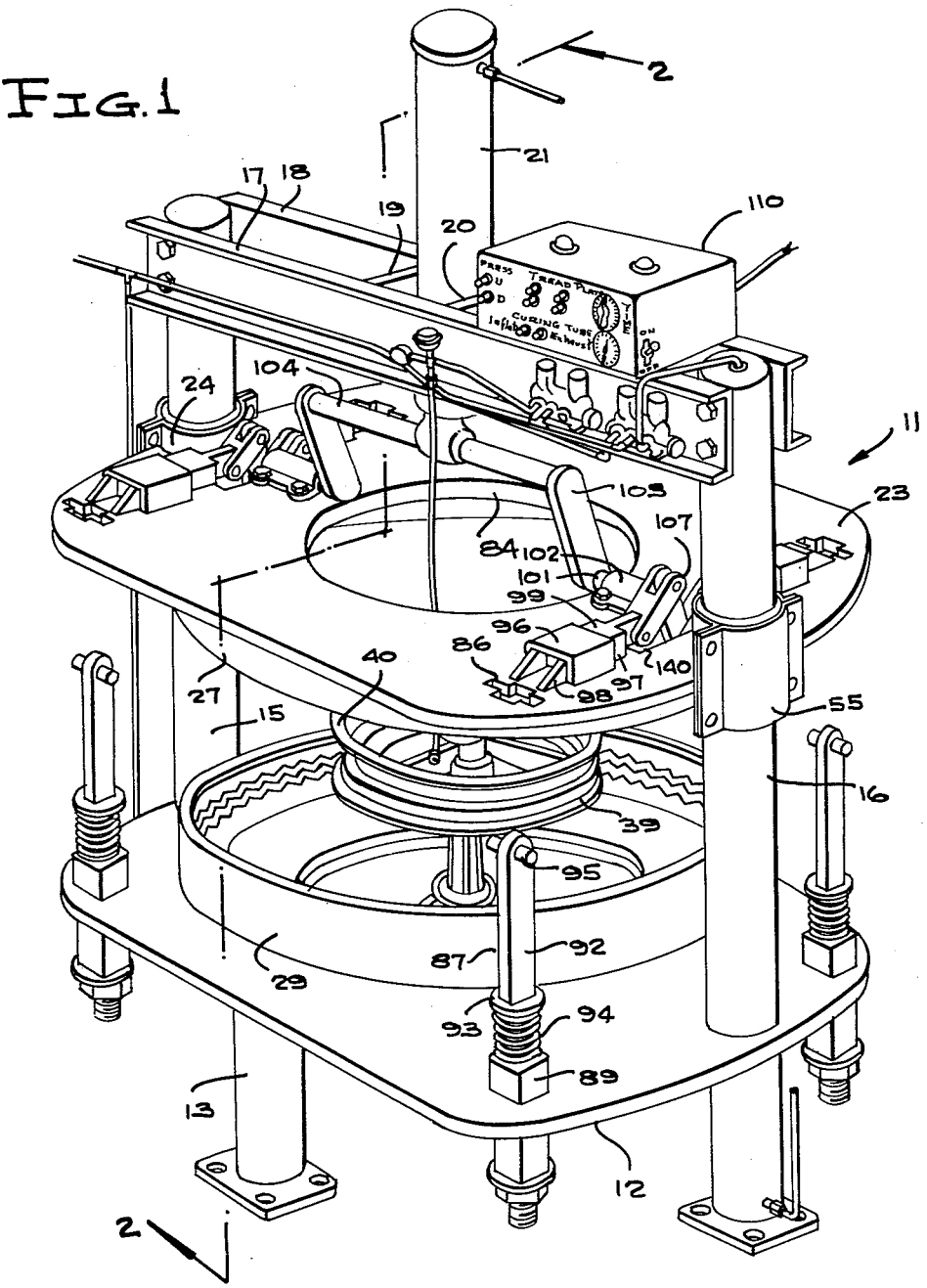
FIGURE 1 is a perspective view of an improved tire recapping press constructed in accordance with the present invention, shown in open position.

Referring to the drawings, the improved tire recapping press is designated generally at 11 and comprises a frame consisting of a horizontal plate member 12 which is supported on the front and rear tubular legs 13 and 14 and on the respective opposite vertical side posts 15 and 16, also of tubular construction. The side posts 15 and 16 extend through apertures provided in the opposite side marginal portions of the horizontal plate member 12 and are welded to the horizontal plate member at said apertures. The side post members 15 and 16 extend upwardly substantial distances above the plate member 12 and are fastened together by a pair of parallel channel bars 17 and 18, said channel bars extending horizontally and forming the top portions of the frame of the press. The channel bars 17 and 18 are rigidly connected at their intermediate portions by a pair of spaced cross bars 19 and 20, and pivoted between the spaced cross bars is a hydraulic cylinder 21, the pivotal connection of said cylinder being shown at 22.

Designated at 23 is a plate member which is slidably engaged with the respective upstanding tubular post members 15 and 16, by means of respective bearing collars 24 and 25 provided on the opposite side edges of the plate member 23 and slidably engaging the respective vertical post members 15 and 16. The plate member 23 has secured thereto the annular top matrix plate 27, said matrix plate facing downwardly and being formed with a cavity 28 adapted to receive steam or any other fluid suitable for use as a heat-transmitting medium. The stationary plate member 12 is formed with the bottom matrix plate 29 which faces upwardly in opposition to the upper matrix plate 27, the bottom plate 29 being formed with a cavity 30 adapted to receive steam or other suitable heat-transmitting material.

The plate member 12 is formed with a central aperture in which is secured a circular bracket assembly 31 comprising a flanged rim 32 and a vertical fluid pressure cylinder 33 rigidly connected by radial braces 34 to the rim 32. Designated at 35 is a second fluid pressure cylinder which is rigidly secured beneath the cylinder 33 in vertical alignment therewith, as by a plurality of tie rods 36 connecting the top flanges of the cylinders 33 and 35, as is clearly shown in FIGURE 5. Cylinder 33 is provided with a piston 37 having the vertically upwardly extending sleeve-like rod 38, to the top end of which is rigidly secured the circular lower tread plate 39. Designated at 40 is an upper tread plate disposed above and in opposition to the lower tread plate 39 and centrally secured to a vertical piston rod 41 extending slidably through the sleeve-like member 38 and secured at its bottom end to a piston 42 slidably engaged in the lower cylinder 35.

The pistons 37 and 42 are actuated from an air supply line 43 through respective solenoid valves 44 and 45 of conventional construction. Thus, the valve 44 is provided with the upper winding 46 and with the lower winding 47. The air supply line 43 is connected to the intermediate portion of the valve casing. A conduit 48 connects the upper portion of the valve casing to the upper portion of cylinder 35 and a conduit 49 connects the lower portion of the valve casing to the lower portion of the cylinder 35. When the winding 46 is energized, the plunger element of the solenoid assembly 44 is moved to connect the fluid pressure supply line 43 to the upper conduit 48, causing a force to be applied to the piston 42 urging said piston downwardly, and consequently urging the upper tread plate 40 in a downward direction. Conversely, when the winding 47 is energized, the plunger element of the valve 44 is moved to a position connecting the fluid pressure supply line 43 to the lower conduit 49, whereby a force is applied to the piston urging said piston upwardly and urging the tread plate 40 in an upward direction.

Similarly, the solenoid valve assembly 45 is provided with the upper winding 50 and the lower winding 51. The air supply line 43 is connected by a conduit 52 to the intermediate portion of the valve casing. An upper conduit 53 connects the upper portion of the valve casing to the upper portion of cylinder 33, whereas a lower conduit 54 connects the lower portion of the valve casing to the lower end portion of cylinder 33. When winding 50 is energized, the plunger assembly of the valve 45 is moved to a position connecting the supply conduit 52 to the upper conduit 53, whereby fluid pressures admitted to the top portion of the cylinder 33, acting to urge the piston 37 downwardly and urging the lower tread plate 39 in a downward direction. When the winding 51 is energized, the plunger assembly of the valve 45 is moved to a position connecting the supply conduit 52 to the lower conduit 54, whereby fluid under pressure is admitted into the lower portion of cylinder 33, acting to urge the piston 37 upwardly and accordingly urging the lower tread plate 39 upwardly.

As will be presently described, the respective solenoid windings 46, 47 may be selectively energized by actuating respective push-button switches 55 and 56. Similarly, the solenoid windings 50 and 51 may be selectively energized by actuating respective push-button switches 57 and 58 provided on the machine.

The tubular post member 16 is employed as a hydraulic reservoir, containing a quantity of hydraulic fluid 59, such as oil, or the like. The space in the top of the post member 16 is adapted to be connected at times to the air supply line 43 through a conventional solenoid valve assembly 61 and a conduit 62 connecting the intermediate portion of the housing of the valve 61 to the fluid pressure supply line 43. A conduit 63 connects the lower end portion of the tubular post member 16 to the top end of the hydraulic cylinder 21. The lower end of hydraulic cylinder 21 is connected by a conduit 64 to one end portion of the casing of valve 61. The other end portion of the casing of the valve is connected by conduit 65 to the top end of the tubular post member 16. The valve 61 comprises the respective operating windings 66 and 67. When the winding 66 is energized the plunger assembly of the valve is moved to a position connecting the air supply conduit 62 to the conduit 64 leading to the lower portion of the cylinder 21, whereby to admit fluid into the lower portion of said cylinder and urge the piston 68 thereof upwardly. When the winding 67 is energized, the plunger assembly of the valve 61 is moved to a position connecting the fluid supply conduit 62 to the conduit 65, whereby fluid pressure is admitted to the top end of a post member 16, being transmitted to the hydraulic fluid 59. The hydraulic fluid is forced through the conduit 63 into the top portion of the cylinder 61, acting to urge the piston 68 downwardly. As in the case of the valve assemblies 44 and 45, the solenoid valve 61 is of conventional construction. The respective windings 66 and 67 may be selectively energized by actuating respective push-button switches 69 and 70 provided on the machine.

Designated at 71 is an elastic tube which is employed to inflate a tire casing 72 and to hold the tire casing inflated for a desired period during the curing of the tire, as will be presently explained. The tube 71 is connected to the fluid pressure supply line 43 by a conduit 73 which is provided with a three-way valve 74 operated by a solenoid assembly 75. The solenoid assembly 75 comprises respective windings 76 and 77, and includes a plunger which is connected to the rotor of the three-way valve 74. Thus, the plunger is provided with an arm 78 which is pivotally connected to a radial arm 79, said radial arm being in turn connected to the rotor of valve 74. When the winding 76 is energized the rotor of valve 74 is moved to a position venting the conduit 73 and allowing the tube 71 to become deflated. When the winding 77 is energized, the valve rotor is moved to a position connecting conduit 73 to the fluid pressure supply line 43, whereby the tube 71 is inflated. The windings 76 and 77 may be selectively energized by actuating respective push-button switches 80 and 81 provided on the machine.

A pressure-responsive switch 82 is connected to the tube inflating conduit 73, said switch closing only when the fluid pressure in the tube 73 drops below a predetermined value, namely, when the tube 71 has become sufficiently deflated to allow the tire 72 to be in a relaxed condition, as will be presently explained. When the pressure in the conduit 73 is above said predetermined value, the switch 82 is held in an open position.

A pressure gauge 83 is provided, said gauge being connected to the conduit 73 to visually indicate the amount of air pressure in said conduit.

As shown in FIGURES 1 and 5, the upper horizontal plate member 23 is formed with a central aperture 84 through which the conduit 73 extends. The upper circular tread plate 40 is formed with a suitable aperture 85 to which conduit 73 likewise extends, as shown in FIGURE 5.

As shown in FIGURE 1, the upper and lower horizontal plates 23 and 12 are generally rectangular in shape and are formed at their corner portions with respective cruciform apertures 86. Vertical upstanding locking bars 87 are mounted in the corner portions of the bottom horizontal plate 12, each of said locking bars comprising a threaded shank portion 88 which extends through a vertical sleeve 89 integrally formed on the corner portion of the bottom plate 12 and which is provided with an anchoring nut 90 engaged against a washer 91 which engages the bottom rim of the associated sleeve element 89. The top portion of the bar member comprises a shank portion of generally rectangular horizontal cross section, designated at 92. The bar member is formed with the circular flange 93 at the bottom of said shank portion, and a coil spring 94 is provided below the flange 93, surrounding the bar member and bearing between the top rim of the sleeve member 89 and the collar element 93, urging the shank portion 92 upwardly and maintaining the bar member in a vertical position.

The sleeve elements 89 are preferably of square cross sectional shape, and the lower portions of the bar members, below the rectangular shank elements 92 are preferably squared to slidably and non-rotatably engage in the sleeve elements 89, whereby to prevent rotation of the bar members 87 and to maintain said bar members in the positions thereof illustrated in FIGURE 1.

The top ends of the shank elements 92 are provided with transversely extending rollers 95, and the top portions of said bar members are thus of a shape adapted to be received within the cruciform openings 86 of top plate 23, the openings being in vertical registry with the respective bar members 87, whereby the top ends of the shank elements 92 will pass through the cruciform openings 86 when the upper horizontal plate member 23 is lowered.

Figure 4:
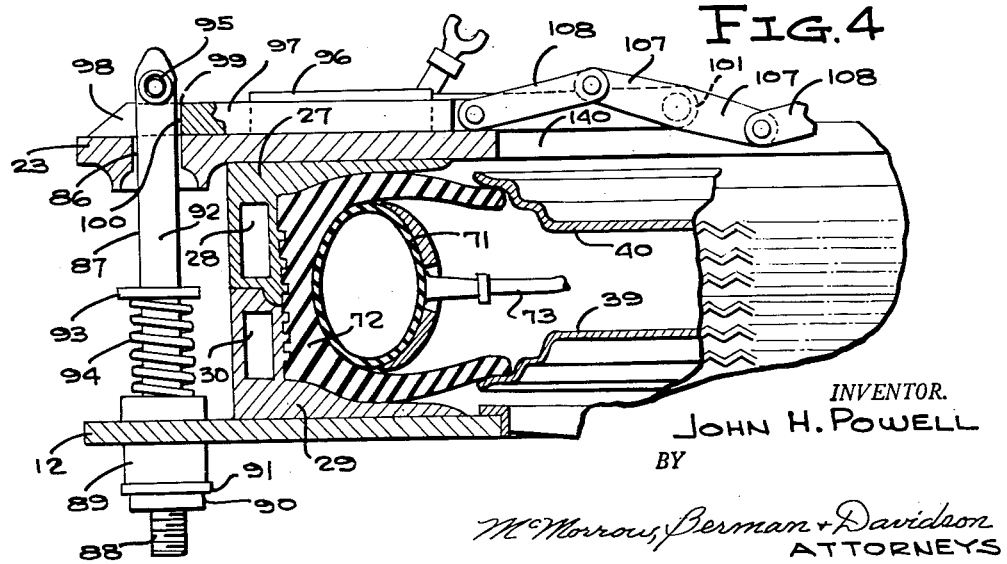
FIGURE 4 is an enlarged cross sectional detail view taken on the line 4—4 of FIGURE 3 and illustrating a tire mounted in the press with the press closed and in position for curing the molded tread of the tire.

Rigidly secured on the top plate 23 inwardly adjacent to and transversely aligned with each of the cruciform openings 86 is a transversely extending rectangular guide sleeve 96 in which is slidably engaged a bolt member 97 of rectangular cross section, said bolt member being provided with triangular parallel end lugs 98, 98 cammingly engageable beneath the respective rollers 95, 95 of the adjacent bar member 87 when the shank portion thereof is extended through the cruciform opening 86. As shown in FIGURE 4, when the bolt members 97 are extended sufficiently outwardly through the guide sleeve 96, the roller members 95 engage on the top surfaces 99 of the associated bolt members 97, the notches 100 in the ends of the bolt members being of sufficient length to allow elements 92 to be received therein after the triangular lugs 98 have passed outwardly beyond the rollers 95. Thus, in the positions of the bolt members 97 illustrated in FIGURE 4, the rollers 95 bear on the horizontal top surfaces 99 of the bolt members and the bar members 87 lock the upper horizontal plate member 23 in a lowered position, as illustrated in FIGURE 4, wherein the upper and lower matrix segments 27 and 29 are in closed mating relationship.

Designated at 101, 101 are respective transversely aligned shaft elements which are rotatably engaged in respective transversely aligned bearing brackets 102, 102 mounted on the upper horizontal plate member 23, said shaft members being connected by respective crank arms 103, 103 to a transversely extending crank rod 104. The crank rod 104 is connected by a turn buckle link member 105 to the lower end of the piston rod 106 associated with the piston 68 of the hydraulic cylinder 21. Rigidly secured to the outer ends of respective shaft members 101, 101 are respective pairs of opposing arms 107, 107 which are connected by respective link bars 108, 108 to the ends of the respective pairs of bolt members 97, 97 provided at the respective sides of the top plate member 23.

Figure 3:
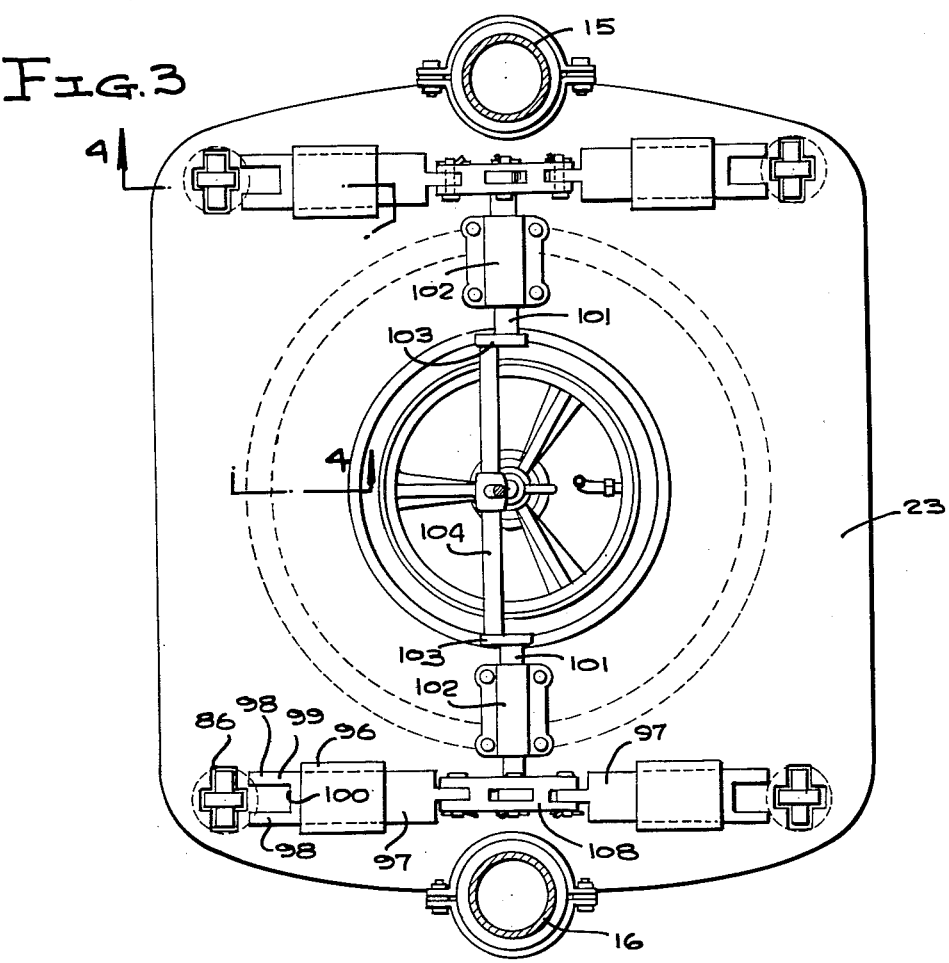
FIGURE 3 is a horizontal cross sectional view taken substantially on the line 3—3 of FIGURE 2.

As shown in FIGURE 3, the arms 107, the link rods 108 and the bolt members 97 lie in the same transverse vertical planes at the respective sides of the upper horizontal plate member 23, whereby rotation of the shaft members 101, 101 in a counterclockwise direction, as viewed in FIGURE 4, causes the link rods 108 to urge the bolt members 97 simultaneously in an outward direction, namely to the locking positions thereof illustrated in FIGURE 4. Conversely, clockwise rotation of the shaft members 101, as viewed in FIGURE 4, simultaneously retracts the locking bolts 97.

The shaft members 101 are rotated in a counterclockwise direction, as viewed in FIGURE 4, responsive to downward movement of the transversely extending horizontal crank bars 104. Such downward movement occurs when the piston rod 106 associated with the cylinder 21 is extended from said cylinder, namely, when the piston 68 is moved downwardly by the admission of hydraulic fluid into the upper portion of the cylinder, as previously described. The bolt members 97 will be retracted when the horizontal rod member 104 is elevated, which occurs when piston 68 is elevated in cylinder 21 responsive to the admission of fluid pressure into the lower portion of the cylinder from the conduit 64.

A timing unit 110 is mounted on the top frame channels 17, 18, the unit 110 also including the various push-button switches 55 to 58 and 69, 70, 80 and 81 previously mentioned. The unit 110 includes a conventional timing assembly comprising a timing motor 111 which is drivingly coupled to a series of timing cams 112, 113, 114, 115, 116 and 117 which respectively control sets of switch contacts 118 to 123. The timing unit is provided with a carrying time adjusting dial 124 enabling the timer to be manually set to provide a desired curing time. A control switch 125 is connected between a source of alternating current and a pair of line wires 126, and 127. The timing motor 111 is connected to the line wires 126 and 127 through the contacts 128 of a relay 129. Line wires 126 and 127 are connected to the primary 130 of a step-down transformer 131. The secondary 132 of the transformer is connected to a pair of wires 133 and 134. The relay 129 is connected to the wires 133 and 134 through the contacts 118 associated with the timer cam 112.

Solenoid winding 66 is connected between wires 133 and 134 through the pressure-responsive switch 82 and the contacts 119 associated with the timer cam 113. The winding of solenoid 166 is also connected between the wires 133 and 134 through a branch circuit which includes the push-button switch 69.

Solenoid winding 67 is connected between the wires 133 and 134 through the push-button switch 70.

Solenoid winding 76 is connected between the wires 133 and 134 through the push-button switch 80. Solenoid winding 77 is connected between the wires 133 and 134 through the push-button switch 81.

The solenoid winding 76 is also connected between the wires 133 and 134 through a branch circuit which includes the switch contacts 120 associated with the cam element 114.

Solenoid winding 46 is connected between the wires 133 and 134 through the switch contacts 121 associated with the cam element 115. The solenoid winding 46 is also connected between wires 133 and 134 through a branch circuit which includes the push-button switch 55.

Solenoid winding 47 is connected between the wires 133 and 134 through a circuit which includes the switch contacts 122 associated with the cam element 116. Solenoid 47 is also connected between the wires 133 and 134 through a branch circuit which includes the push-button switch 56.

Solenoid winding 51 is connected between the wires 133 and 134 through a circuit which includes the switch contacts 123 associated with the cam element 117. The solenoid winding 51 is also connected between wires 133 and 134 through a branch circuit which includes the push-button switch 58.

The solenoid winding 50 is connected between the wires 133 and 134 through a circuit which includes the push-button switch 57.

As shown in FIGURE 1, the top horizontal plate member 23 is formed with rectangular apertures 140 subjacent the arms 107, 107 and the link bars 108, 108 connected thereto, to provide clearance for said arms and for the portions of the link bars connected to the arms.

Suitable conduit means may be provided for admitting the curing medium, for example, steam, or other high temperature fluid, into the cavities 28 and 30 of the upper and lower matrix segments 27 and 29. Alternatively, electric heating windings may be employed in the matrix segments to provide the heat required for curing.

In a typical cycle of operation of the apparatus, the switch 125 is first closed to energize the transformer 131. The push-button switch 69 is then actuated to open the press, which occurs as a result of the energization of the solenoid winding 66, whereby pressure fluids admitted into the lower portion of cylinder 21, causing the piston 68 to rise and elevate the upper matrix segment 27 to the position thereof illustrated in FIGURE 5. The tire to be processed is then inserted on the lower tread plate 39.

Push-button switch 55 is then actuated to energize the solenoid 46 and to cause fluid under pressure to be admitted into the upper portion of cylinder 35, whereby to move the upper tread plate 40 downwardly and to compress the beads of the tire.

Push-button switch 57 is then actuated to energize solenoid 50 and to cause fluid under pressure to be admitted into the upper portion of cylinder 38, whereby to move the tread plates downwardly and to lower the tire into the bottom matrix segment 29.

Push-button switch 70 is then actuated to energize solenoid winding 67 and to thereby cause pressure fluid to be admitted into the top end of the post member 16, whereby hydraulic pressure is applied to the upper portion of cylinder 21, causing piston 68 to move the upper matrix segment 27 downwardly and to close the press. The downward force exerted on the piston rod 106 causes the locking mechanism to operate, whereby the bolt members 97 are moved outwardly into camming engagement beneath the rollers 95 after the upper matrix segment 27 has come into mating contact with the lower matrix segment 29, whereby the rollers 95 engage on the horizontal top surfaces 99 of the locking bolts 97. This locks the press on the tire in curing position.

Push-button switch 81 is then actuated to inflate the tire, by energizing solenoid 77, whereby valve 74 is operated to admit fluid under pressure into the tube 71 through the conduit 73.

The timer control dial 124 is then set to the desired curing time, for example, to a curing time of one hour and five minutes. This adjustment closes the contacts 118, as shown in FIGURE 5, starting the timing motor 111, since closure of contacts 118 energizes the relay 129. Energization of relay 129 closes contacts 128, connecting motor 111 to the line wires 126 and 127.

After a sufficient time to allow the tire to become fully inflated, for example, a period of five minutes, cam 116 closes its contacts 122, energizing solenoid 47 and causing fluid under pressure to be admitted into the lower portion of cylinder 35, elevating the upper tread plate 40 and separating the tread plates to allow the tire to cure in a relaxed position.

At the end of the curing period, cam 114 closes its contacts 120 to energize solenoid 76, thereby operating valve 74 to vent conduit 73 and to release air from the tube 71. At the same time cam 115 closes its contacts 121 to energize solenoid 46 and to cause fluid under pressure to be admitted into the upper portion of cylinder 35, closing the tread plates, namely, urging tread plate 40 toward tread plate 39.

Subsequently, cam 117 closes its contacts 123, whereby to energize solenoid winding 51 and to cause fluid under pressure to be admitted into the lower portion of cylinder 33, whereby to apply upward force to the tread plates 39, 40. (Actually, the fluid pressure is applied beneath the piston 37, whereby the upward force is applied directly to the lower tread plate 39, but since the upper tread plate 40 is restrained, the upward force on tread plate 39 is transmitted through the tire to the upper tread plate 40.).

After a suitable period, for example, a period of thirty seconds, cam element 113 closes its contacts 119, whereby to energize solenoid winding 66 (assuming switch 82 to be closed) and to thus cause fluid under pressure to be admitted through the conduit 64 into the lower portion of cylinder 21. This elevates the upper matrix segment 27 and opens the press. This also disengages the locking bolts 97 from beneath the rollers 95. (Upward movement of piston rod 106 causes shaft elements 101 to be rotated in a clockwise direction, as viewed in FIGURE 4, and to retract the bolts 97, as above explained.)

Since an upward force is applied to the tread plates 39, 40, the tread plates rise and push the tire free of the lower matrix segment as the press continues to open, and as the opening movement of the upper matrix segment 27 continues, the tire is pulled free from the upper matrix segment.

If the tire is not sufficiently deflated, switch 82 remains open, preventing solenoid 66 from being energized, thereby preventing damage to the tire or to the press.

Figure 2:
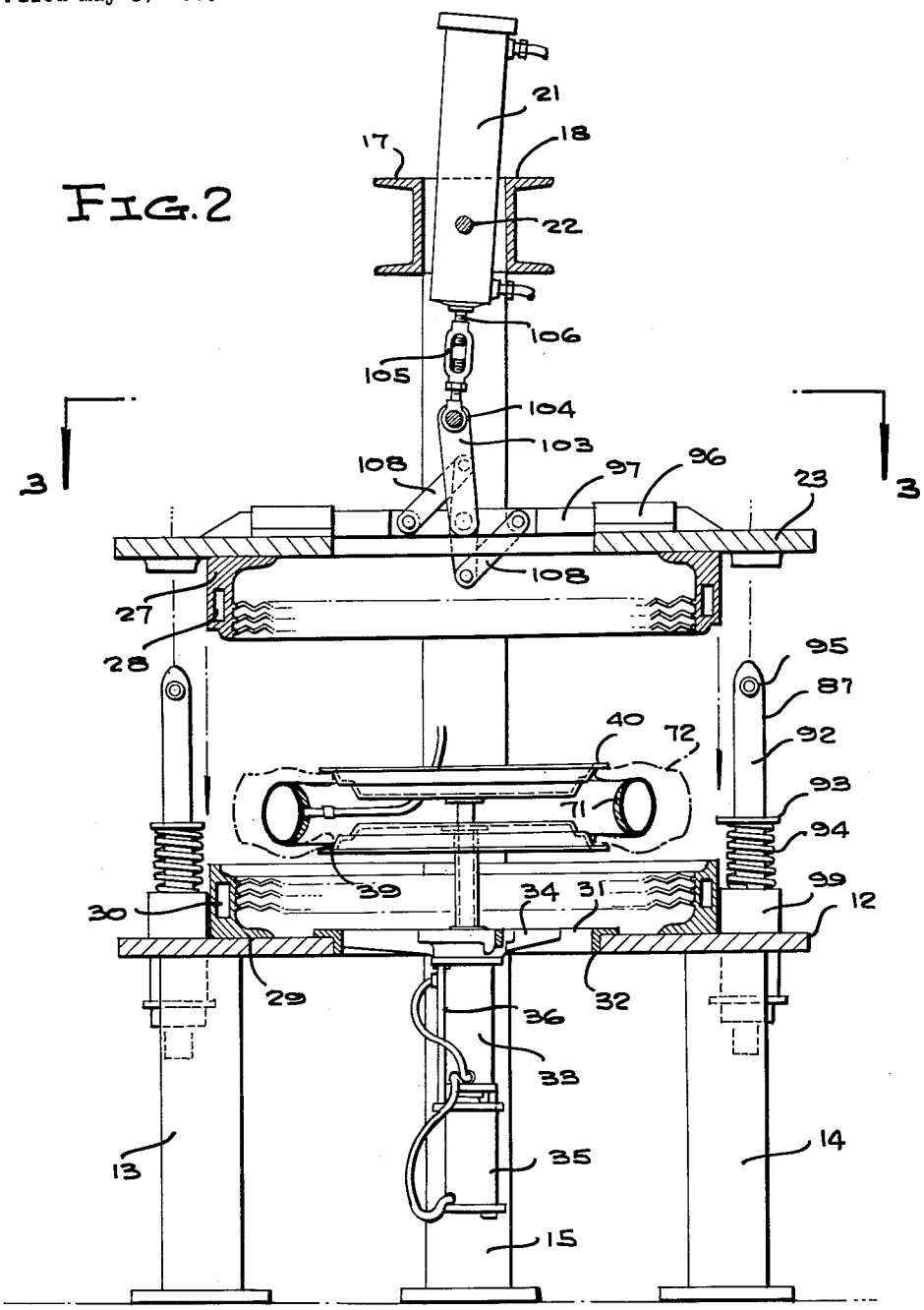
FIGURE 2 is a vertical cross sectional view taken substantially on the line 2—2 of FIGURE 1.

When the piston 68 has been moved upwardly to its uppermost position, for example, the position thereof illustrated in FIGURE 5, the upper matrix segment 27 is in the position illustrated substantially in FIGURE 2, and the tire supporting means, comprising the tread plates 39 and 40 is in a position intermediate the top and bottom matrix segments, as illustrated.

At the conclusion of the above described cycle of operations, the cured tire may be removed from between the tread centering plates 39 and 40 and the next tire to be processed may be inserted in place of the previous tire.

As will be seen from FIGURE 3, the transversely extending horizontal shaft member 104 is somewhat offset laterally with respect to the transverse vertical plane containing the shaft elements 101, 101, so that when the piston rod 106 is extended from the hydraulic cylinder 21, the rod acts first to allow the upper tread plate 27 to be lowered into mating engagement with the lower tread plate 29, after which the continued extension of the piston rod causes the crank arms 103 to be rotatated downwardly and thus causes the shaft elements 101, 101 to be rotated in a counterclockwise direction, as viewed in FIGURE 4. As previously explained, rotation of the arms 107 with the shaft elements 101 causes the bolt members 97 to be moved outwardly toward locking engagement with the roller members 95.

While a specific embodiment of a semi-automatic tire recapping press has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a tire recapping press, a support including a horizontal bottom tire recapping matrix segment, a top tire recapping matrix segment disposed above and in opposing relation to said bottom matrix segment, means slidably supporting said top matrix segment in vertical alignment with said bottom matrix segment, a fluid pressure cylinder mounted on said support above said top segment, a piston in said cylinder, a piston rod connected to said piston and projecting downwardly therefrom, linkage means connecting said piston rod to said top segment and being constructed and arranged to transmit force from said piston rod to move said top matrix segment downwardly into mating engagement with said bottom segment, upstanding anchor means slidably mounted on said support, spring means biasing said anchor means upwardly relative to said support, means limiting upward movement of said anchor means with respect to said support, a plurality of horizontal bolt members slidably mounted on said top matrix segment, respective pairs of oppositely projecting transverse abutment members on the top end portions of said anchor means, respective pairs of parallel end lugs on the bolt members spaced to receive the anchor means therebetween and being cammingly engageable beneath the abutment members responsive to extension of the bolt members, and means operatively connecting said bolt members to said linkage means and extending said bolt members responsive to downward movement of said top matrix segment substantially into mating engagement with said bottom segment, said parallel end lugs being located so as to lockingly engage beneath the abutment members responsive to extensile movement of the bolt members when the matrix segments are in mating engagement.

2. In a tire recapping press, a horizontal bottom matrix segment, a horizontal top matrix segment opposing said bottom segment, means slidably supporting said top segment for movement into mating engagement with said bottom segment, a fluid pressure cylinder mounted above the top segment and having a piston provided with a downwardly extending piston rod, said top segment being provided with a plurality of apertures, upstanding anchor bars resiliently mounted on the bottom segment and aligned with said apertures and being receivable therethrough responsive to downward movement of the top segment into mating engagement with the bottom segment, respective locking bolts slidably mounted on the top segment and being extensible into locking engagement with said anchor bars, respective pairs of oppositely projecting transverse abutment members on the top end portions of said anchor bars, respective pairs of parallel end lugs on the bolt members spaced to receive the anchor bars therebetween and being cammingly engageable beneath the abutment members responsive to extension of the bolt members, and link means interconnecting said piston rod, top segment and locking bolts and being constructed and arranged to lower the top segment responsive to extension of said piston rod from said cylinder and to extend said locking bolts outwardly sufficiently to cause the anchor bars to be received between the respective pairs of parallel end lugs on the locking bolts and to cause the end lugs to lockingly engage beneath the transverse abutment members on the anchor bars responsive to the mating engagement of said top segment with said bottom segment.

3. In a tire recapping press, a horizontal bottom matrix segment, a horizontal top matrix segment opposing said bottom segment, means slidably supporting said top segment for movement into mating engagement with said bottom segment, a fluid pressure cylinder mounted above the top segment and having a piston provided with a downwardly extending piston rod, said top segment being provided with a plurality of apertures, upstanding anchor bars resiliently mounted on the bottom segment aligned with said apertures and being receivable therethrough responsive to downward movement of the top segment into mating engagement with the bottom segment, respective locking bolts slidably mounted on the top segment and being extensible into locking engagement with said anchor bars, respective pairs of oppositely projecting transverse abutment members on the top end portions of said anchor bars, respective pairs of parallel end lugs on the bolt members spaced to receive the anchor bars therebetween and being cammingly engageable beneath the abutment members responsive to extension of the bolt members, horizontal shaft means rotatably mounted on said top segment, crank means connecting said shaft means to said piston rod, and link means connecting said shaft means to said locking bolts, said shaft means, crank means, link means and locking bolts being constructed and arranged to support said top segment and to allow said top segment to descend toward the bottom segment when the piston rod is extended from said cylinder and to apply extensile force on said locking bolts responsive to the mating engagement of said top segment with said bottom segment sufficient to cause the anchor bars to be received between the respective parallel end lugs on the locking bolts and to cause the parallel end lugs to engage beneath the transverse abutment members on the anchor bars.

4. In a tire recapping press, a horizontal bottom matrix segment, a horizontal top matrix segment opposing said bottom segment, means slidably supporting said top segment for movement into mating engagement with said bottom segment, a fluid pressure cylinder mounted above the top segment and having a piston provided with a downwardly extending piston rod, upstanding anchor means resiliently mounted on the bottom segment, respective pairs of oppositely projecting transverse abutment members on the top portions of said anchor means, locking means on the top segment formed and arranged to at times receive said anchor means and to lockingly engage beneath said transverse abutment members, tire supporting means movably mounted on and receivable in the bottom segment, means interconnecting said piston rod, top segment and locking means and being constructed and arranged to lower said top segment into mating engagement with the bottom segment responsive to extension of the piston rod from said cylinder and to move said locking means sufficiently to receive said anchor means and lockingly engage beneath said transverse abutment members responsive to the mating engagement of said top segment with said bottom segment, and means to sequentially disengage said locking means from said anchor means, elevate said top segment, and elevate said tire supporting means from said bottom segment to a position intermediate said top and bottom segments.

References Cited in the file of this patent

UNITED STATES PATENTS

| | | |
|---|---|---|
| 1,474,066 | Brown | Nov. 13, 1923 |
| 1,581,090 | Schmidt | Apr. 13, 1926 |
| 1,841,490 | Maynard | Jan. 19, 1932 |
| 2,468,251 | Wiederman | Apr. 26, 1949 |
| 2,734,225 | Glynn | Feb. 14, 1956 |